United States Patent
Mellas et al.

(10) Patent No.: US 11,860,518 B1
(45) Date of Patent: Jan. 2, 2024

(54) BIMINI MOUNTABLE CAMERA

(71) Applicant: Protomet Corporation, Oak Ridge, TN (US)

(72) Inventors: Nathan Mellas, Lenoir City, TN (US); Matt Reid, Knoxville, TN (US)

(73) Assignee: Protomet Corporation, Oak Ridge, TN (US)

( * ) Notice: Subject to any disclaimer, the term of this patent is extended or adjusted under 35 U.S.C. 154(b) by 0 days.

(21) Appl. No.: 18/344,410

(22) Filed: Jun. 29, 2023

(51) Int. Cl.
  *G03B 17/56* (2021.01)
  *G03B 17/08* (2021.01)
  *B63B 17/00* (2006.01)

(52) U.S. Cl.
  CPC ........... *G03B 17/561* (2013.01); *G03B 17/08* (2013.01); *B63B 17/00* (2013.01)

(58) Field of Classification Search
  CPC ........ G03B 17/561; G03B 17/08; B63B 17/00
  See application file for complete search history.

(56) References Cited

U.S. PATENT DOCUMENTS

| | | | |
|---|---|---|---|
| 2014/0197218 A1* | 7/2014 | Jordan | B60Q 1/18 224/545 |
| 2023/0174197 A1* | 6/2023 | Swaney | B63B 49/00 396/419 |

* cited by examiner

*Primary Examiner* — Clayton E. LaBalle
*Assistant Examiner* — Fang-Chi Chang
(74) *Attorney, Agent, or Firm* — Robinson IP Law, PLLC

(57) ABSTRACT

Various implementations include a bimini mountable camera device. The device includes a camera and first and second shell portions. The first shell portion has a first end and a second end. The first end of the first shell portion defines a central opening extending along a central axis to the second end of the first shell portion. The second end of the first shell portion defines a first groove extending along a first groove axis that extends perpendicular to the central axis. The second shell portion has a first end and a second end. The first end of the second shell portion is couplable to the second end of the first shell portion. The first end of the second shell portion defines a second groove extending along a second groove axis that extends parallel to the first groove axis. The camera is at least partially disposed within the central opening.

20 Claims, 4 Drawing Sheets

BIMINI MOUNTABLE CAMERA

BACKGROUND

Many watercraft owners use their watercraft for water sports, such as skiing, wakeboarding, or wake surfing. To capture video of the water sports, cameras have been mounted to various portions of the watercraft. Current solutions for camera mounting include coupling the camera to a tower of the watercraft. By mounting the camera to the tower of the watercraft, the camera has a high vantage point of the water sport behind the watercraft that is typically unobstructed. However, the bimini covers of some watercraft extend above and behind the tower when in a deployed position. In the deployed position, many of these bimini covers obstruct the view of a camera mounted to the tower of the watercraft. Thus, there is a need for a camera mounting system that provides for a high vantage point for the camera that is not obstructed by any other portions of the watercraft.

SUMMARY

Various implementations include a bimini mountable camera device. The device includes a first shell portion, a second shell portion, and a camera. The first shell portion has a first end and a second end opposite and spaced apart from the first end of the first shell portion. The first end of the first shell portion defines a central opening extending along a central axis to the second end of the first shell portion. The second end of the first shell portion defines a first groove extending along a first groove axis. The first groove axis extends perpendicular to the central axis. The second shell portion has a first end and a second end opposite and spaced apart from the first end of the second shell portion. The first end of the second shell portion is couplable to the second end of the first shell portion. The first end of the second shell portion defines a second groove extending along a second groove axis. The second groove axis extends parallel to the first groove axis when the first end of the second shell portion is coupled to the second end of the first shell portion. The camera is at least partially disposed within the central opening.

In some implementations, the first groove has a semi-circular cross-section as viewed in a plane perpendicular to the first groove axis. In some implementations, the second groove has a semi-circular cross-section as viewed in a plane perpendicular to the second groove axis. In some implementations, a radius of curvature of the first groove as viewed in a plane perpendicular to the first groove axis is the same as a radius of curvature of the second groove as viewed in a plane perpendicular to the second groove axis. In some implementations, a radius of curvature of the first groove as viewed in a plane perpendicular to the first groove axis and a radius of curvature of the first groove as viewed in a plane perpendicular to the first groove axis are sized to receive a portion of a frame for a bimini.

In some implementations, the second end of the first shell portion defines a first set of one or more fastener openings. In some implementations, the first end of the second shell portion defines a second set of one or more fastener openings. In some implementations, each of the fastener openings of the first set of one or more fastener openings is axially alignable with a different one of the second set of one or more fastener openings when the first end of the second shell portion is coupled to the second end of the first shell portion. In some implementations, the first end of the second shell portion is coupled to the second end of the first shell portion by one or more fasteners extending through a first fastener opening of the first set of one or more fastener openings and a second fastener opening of the second set of one or more fastener openings.

In some implementations, the central opening is a first central opening. In some implementations, the second end of the second shell portion defines a second central opening. In some implementations, a cable of the camera is configured to extend through second central opening when the first end of the second shell portion is coupled to the second end of the first shell portion.

In some implementations, the first shell portion, the second shell portion, and the camera form a water-tight seal when the first end of the second shell portion is coupled to the second end of the first shell portion.

In some implementations, one of the second side of the first shell portion or the first side of the second shell portion defines one or more locator pin openings. In some implementations, the device further includes one or more locator pins. In some implementations, each of the one or more locator pins are disposed within a different one of the locator pin openings. In some implementations, the one or more locator pin openings includes two locator pin openings.

Various other implementations include a bimini mounted camera system. The system includes a frame for a bimini and a bimini mountable camera device, as described above. The second side of the first shell portion is coupled to the first side of the second shell portion such that a portion of the frame of the bimini is disposed within the first groove and the second groove.

In some implementations, the first groove has a semi-circular cross-section as viewed in a plane perpendicular to the first groove axis. In some implementations, the second groove has a semi-circular cross-section as viewed in a plane perpendicular to the second groove axis. In some implementations, a radius of curvature of the first groove as viewed in a plane perpendicular to the first groove axis is the same as a radius of curvature of the second groove as viewed in a plane perpendicular to the second groove axis.

In some implementations, the second end of the first shell portion defines a first set of one or more fastener openings. In some implementations, the first end of the second shell portion defines a second set of one or more fastener openings. In some implementations, each of the fastener openings of the first set of one or more fastener openings is axially aligned with a different one of the second set of one or more fastener openings. In some implementations, the first end of the second shell portion is coupled to the second end of the first shell portion by one or more fasteners extending through a first fastener opening of the first set of one or more fastener openings and a second fastener opening of the second set of one or more fastener openings.

In some implementations, the central opening is a first central opening. In some implementations, the second end of the second shell portion defines a second central opening, wherein a cable of the camera extends through second central opening.

In some implementations, the first shell portion, the second shell portion, and the camera form a water-tight seal.

In some implementations, one of the second side of the first shell portion or the first side of the second shell portion defines one or more locator pin openings. In some implementations, the system further includes one or more locator pins. In some implementations, the portion of the frame of the bimini defines frame openings. In some implementations, each of the one or more locator pins are disposed within a different one of the locator pin openings and within a different one of the frame openings. In some implementations, the one or more locator pin openings comprises two locator pin openings.

BRIEF DESCRIPTION OF DRAWINGS

Example features and implementations of the present disclosure are disclosed in the accompanying drawings. However, the present disclosure is not limited to the precise arrangements and instrumentalities shown. Similar elements in different implementations are designated using the same reference numerals.

DETAILED DESCRIPTION

The devices, systems, and methods disclosed herein provide for a camera mounting device that is couplable to the frame of a bimini of a watercraft. The camera mounting device can be coupled to an aft portion of the frame of a bimini. By being coupled to the bimini of the watercraft, the camera has a high vantage point relative to the rest of the watercraft that has an unobstructed view of water sports behind the watercraft.

As mentioned above, the view of cameras mounted to the tower of a watercraft can sometimes be obstructed buy a bimini of the watercraft when the bimini is in a deployed position. In these configurations, the bimini of the watercraft must be lowered in order to use the camera. However, by mounting the camera to the bimini itself, the view of the camera is less likely to be obstructed.

In some implementations, the device includes a first shell portion and a second shell portion that are disposable on opposite sides of a portion of the frame of the bimini to clamp the shell of the device onto the frame. This design allows the camera mounting device to be retrofit onto an existing bimini frame. The design also allows the camera mounting device to be easily removed from the bimini frame when not in use.

Various implementations include a bimini mountable camera device. The device includes a first shell portion, a second shell portion, and a camera. The first shell portion has a first end and a second end opposite and spaced apart from the first end of the first shell portion. The first end of the first shell portion defines a central opening extending along a central axis to the second end of the first shell portion. The second end of the first shell portion defines a first groove extending along a first groove axis. The first groove axis extends perpendicular to the central axis. The second shell portion has a first end and a second end opposite and spaced apart from the first end of the second shell portion. The first end of the second shell portion is couplable to the second end of the first shell portion. The first end of the second shell portion defines a second groove extending along a second groove axis. The second groove axis extends parallel to the first groove axis when the first end of the second shell portion is coupled to the second end of the first shell portion. The camera is at least partially disposed within the central opening.

Various other implementations include a bimini mounted camera system. The system includes a frame for a bimini and a bimini mountable camera device, as described above. The second side of the first shell portion is coupled to the first side of the second shell portion such that a portion of the frame of the bimini is disposed within the first groove and the second groove.

Figure 1:
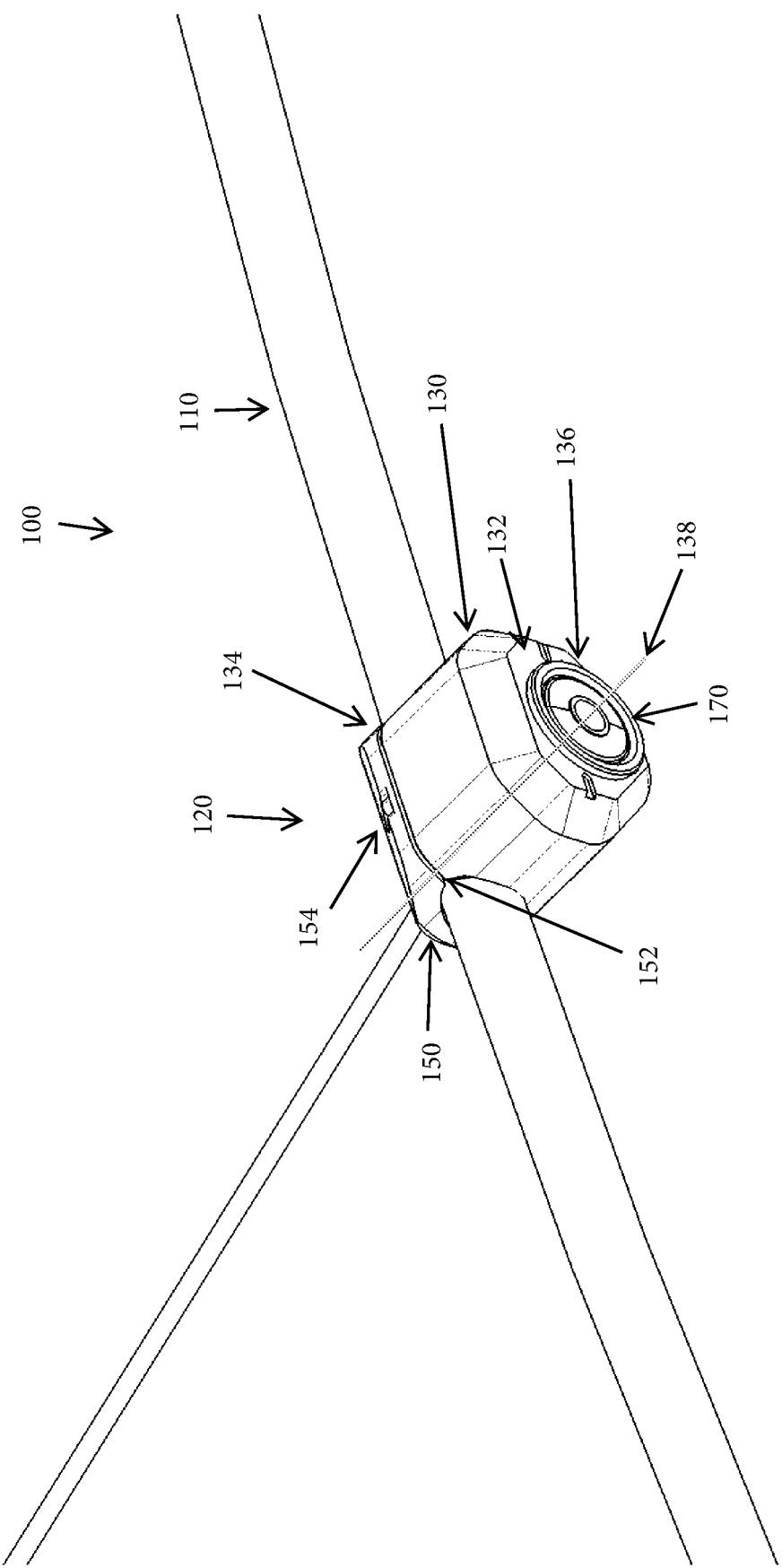
FIG. 1 is a perspective view of a bimini mounted camera system, according to one implementation.
Figure 2:
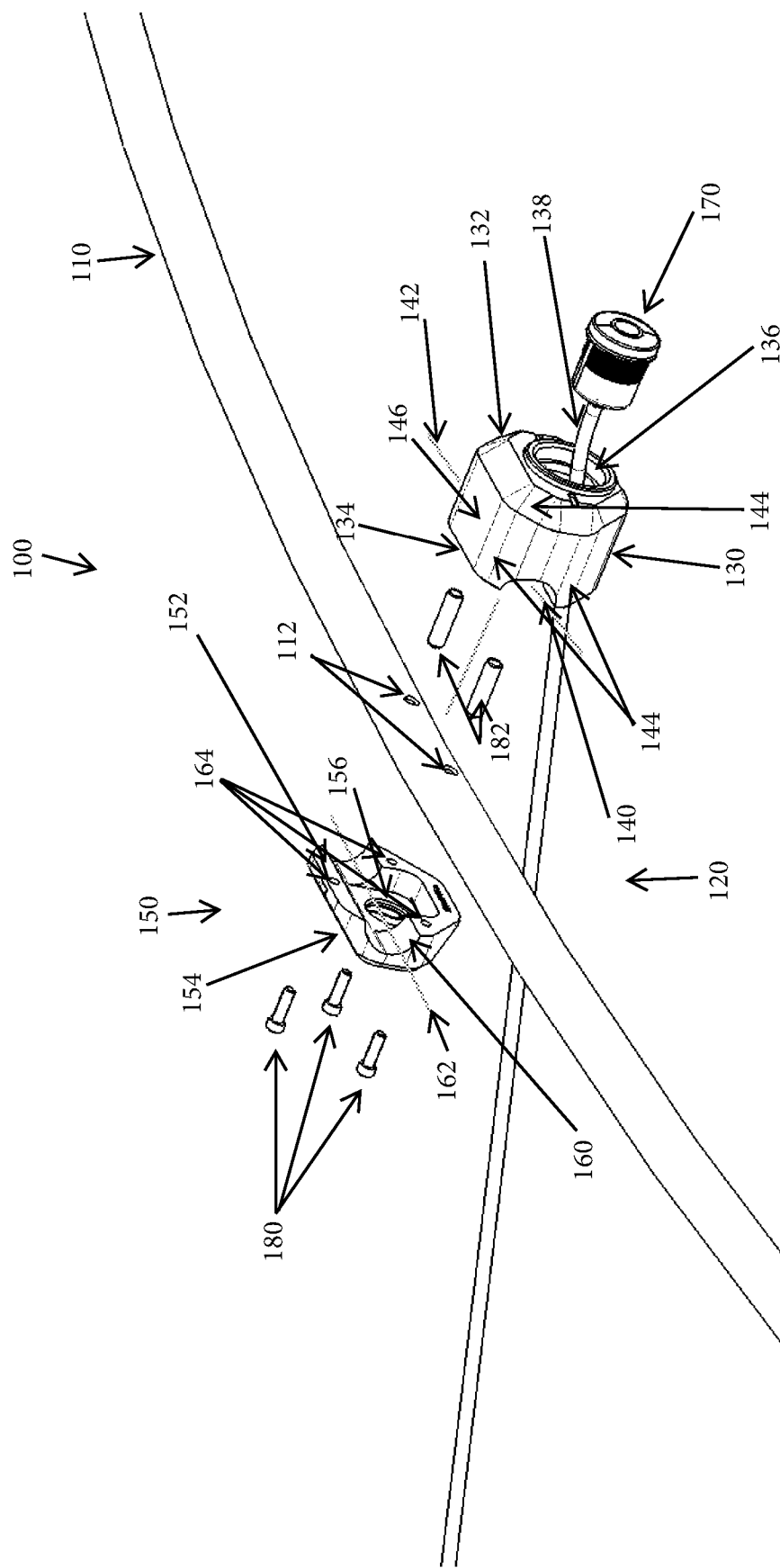
FIG. 2 is an exploded cross-sectional view of the bimini mounted camera system of FIG. 1.
Figure 3:
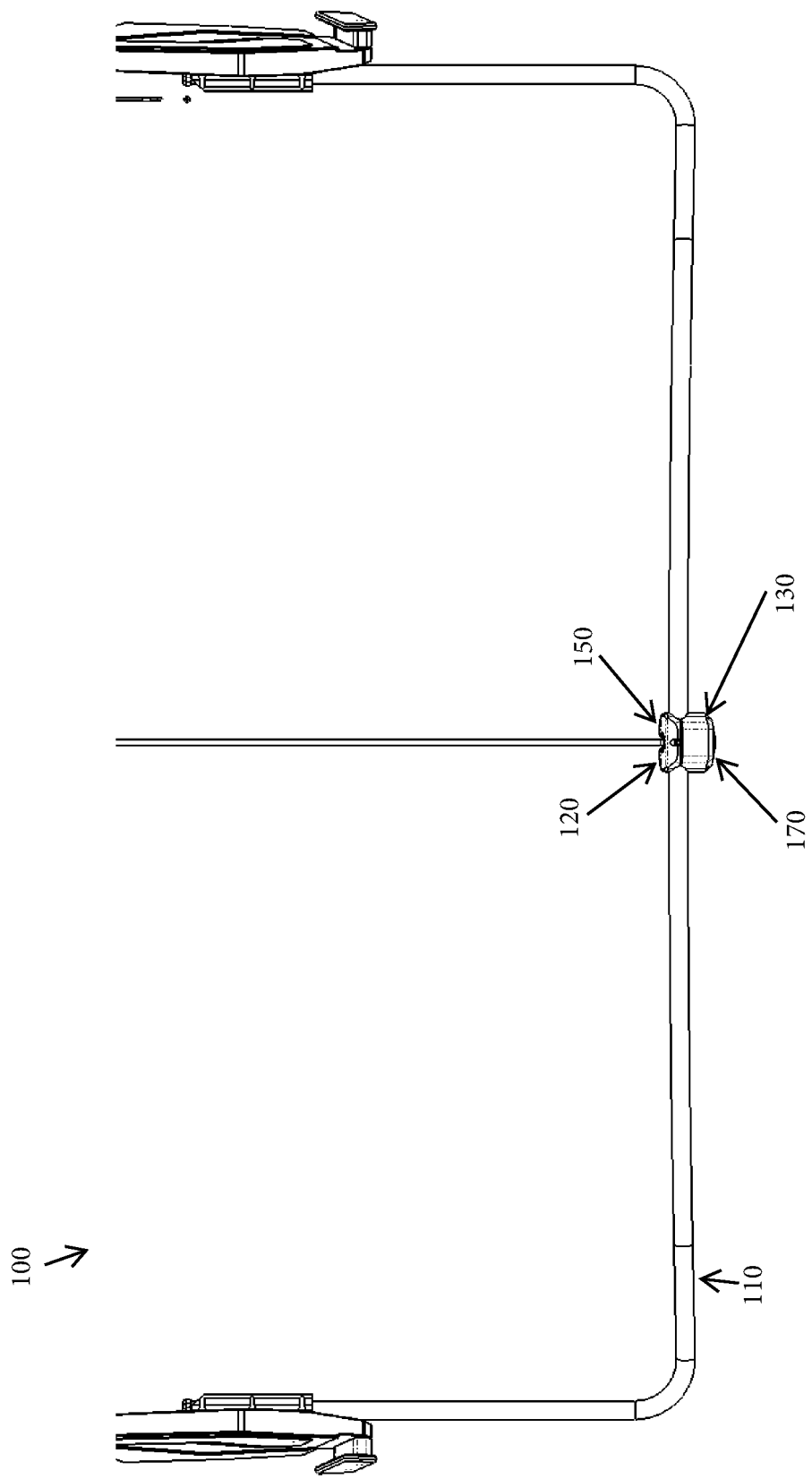
FIG. 3 is a top view of the bimini mounted camera system of FIG. 1.
Figure 4:
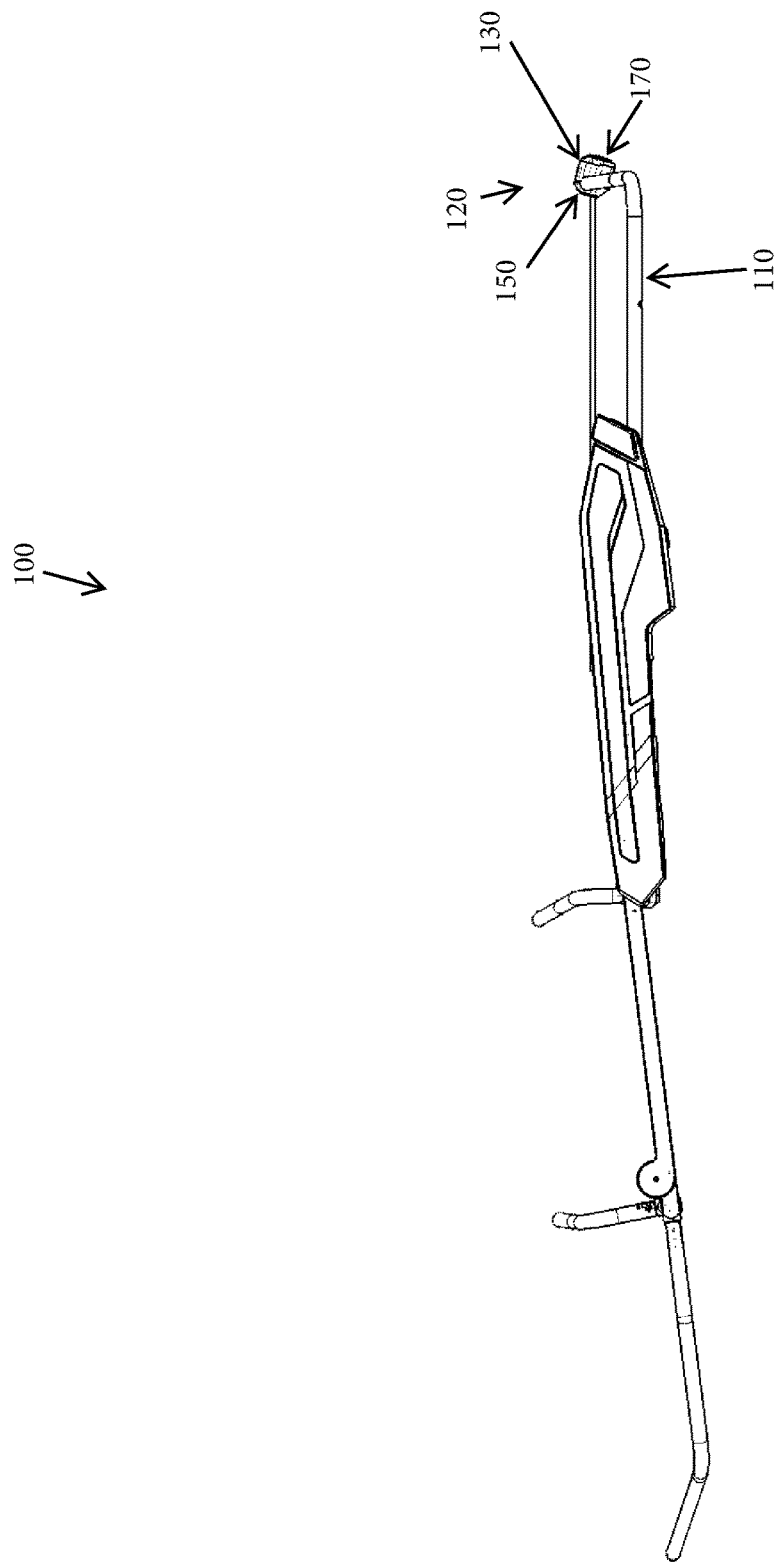
FIG. 4 is a side view of the bimini mounted camera system of FIG. 1.

FIGS. 1-4 show a bimini mounted camera system 100 according to aspects of various implementations. The system 100 includes a frame 110 for a bimini and a bimini mountable camera device 120. The bimini frame 110 includes at least one hollow tube. The tube has a circular shape in a plane perpendicular to a longitudinal center line of the tubing. A portion of the tubing of the frame 110 includes two frame openings 112 that are circular openings extending from an outer surface of the tube to the hollow center of the tube.

The bimini mountable camera device 120 includes a first shell portion 130, a second shell portion 150, and a camera 170.

The first shell portion 130 has a first end 132 and a second end 134 opposite and spaced apart from the first end 132 of the first shell portion 130. The first end 132 of the first shell portion 130 defines a central opening 136 extending along a central axis 138 to the second end 134 of the first shell portion 130. The camera 170 is sized such that the camera 170 is disposable within the central opening 136 to form a water-tight seal. Since the camera 170 of the device 120 is intended to be used on a watercraft, the camera 170 shown in FIGS. 1-4 is a waterproof camera. However, in some implementations, the camera can be any type of motion capture camera known in the art.

The second end 134 of the first shell portion 130 defines a first groove 140 extending along a first groove axis 142. The first groove axis 142 extends perpendicular to the central axis 138 of the central opening 136.

The second shell portion 150 has a first end 152 and a second end 154 opposite and spaced apart from the first end 152 of the second shell portion 150. The first end 152 of the second shell portion 150 is couplable to the second end 134 of the first shell portion 130, as discussed below. Similar to the first shell portion 130, the first end 152 of the second shell portion 150 defines a second groove 160 extending along a second groove axis 162. The second groove axis 162 extends parallel to the first groove axis 142 when the first end 152 of the second shell portion 150 is coupled to the second end 134 of the first shell portion 130.

The first groove 140 and the second grove 160 each have a semi-circular cross-section as viewed in a plane perpendicular to their respective groove axes 142, 162. The radius of curvature of the first groove 140 as viewed in a plane perpendicular to the first groove axis 142 is the same as a radius of curvature of the second groove 160 as viewed in a plane perpendicular to the second groove axis 162. The radius of curvature of the first groove 140 and the second groove 160 is the same as the radius of curvature of the portion of the tube of the frame 110 of the bimini. Thus, the second end 134 of the first shell portion 130 and the first end 152 of the second shell portion 150 can be coupled together such that the first groove 140 and the second groove 160 form the cylindrical passage, and the portion of the tube of the frame 110 of the bimini can be disposed within the cylindrical passage to couple the device 120 to the frame 110 of the bimini.

Although the first groove 140 and the second groove 160 each have a semicircular cross section as viewed in a plane perpendicular to their respective groove axes 142, 162, in some implementations the first groove and the second groove each have a cross-sectional shape that corresponds to the portion of the frame of the bimini to which the device is configured to be coupled. In some implementations, one of the first shell portion or the second shell portion does not include a groove, and the other of the second show portion or the first show portion defines the single groove. In some implementations, the device only includes a single shell portion that is couplable to a portion of the frame of the bimini.

The second end 134 of the first shell portion 130 defines a first set of one or more fastener openings 144. Each of the fastener openings 144 of the first set of one or more fastener openings 144 is a threaded opening. The first end 152 of the second shell portion 150 defines a second set of one or more fastener openings 164 extending to the second end 154 of the second shell portion 150. Each of the fastener openings of the first set of one or more fastener openings 144 is axially aligned with a different one of the fastener openings of the second set of one or more fastener openings 164 when the first end 152 of the second shell portion 150 is coupled to the second end 134 of the first shell portion 130.

The device includes one or more fasteners 180. Each of the one or more fasteners 180 is disposable within a different one of the fastener openings of the second set of one or more fastener openings 164 such that each of the one or more fasteners 180 is threadingly engageable with a different one of the fastener openings of the first set of one or more fastener openings 144 to couple the first shell portion 130 to the second shell portion 150.

Although the first set of one or more fastener openings 144 and the second set of one or more fastener openings 164 shown in FIGS. 1-4 each include three fastener openings, in some implementations, the first set of one or more fastener openings and the second set of one or more fastener openings can each include any number of one or more fastener openings. Although each of the fastener openings of the first set of one or more fastener openings 144 includes a threaded opening, in some implementations, each of the fastener openings of the first set of one or more fastener openings can include a through hole extending from the second side of the first shell portion to the first side of the first shell portion. In some implementations, the second set of one or more fastener openings can include threaded openings extending from the first side of the second shell portion toward the first side of the second shell portion.

In some implementations, the device does not include fastener openings or fasteners and the first shell portion and the second shell portion are couplable to each other by any other means known in the art. In some implementations the first shell portion and the second shell portion are permanently coupled to each other. In some implementations, the device is permanently coupled to the frame of the bimini. In some implementations the device is directly coupled to the frame of the bimini by fasteners, welding, adhesive, ties, straps, interlocking features, or any other means known in the art.

The second end 134 of the first shell portion 130 shown in FIGS. 1-4 defines two locator pin openings 146. The two locator pin openings 146 of the first shell portion 130 are located such that each of the two locator pin openings 146 is alignable with a different one of the two frame openings 112 of the bimini frame 110 when the portion of the bimini frame 110 is disposed within the first groove 140 of the first shell portion 130. The device 120 further includes two locator pins 182. Each of the locator pins 182 is at least partially disposed within a different one of the two locator pin openings 146 such that a portion of each of the two locator pins 182 extends away from the second side 134 of the first shell portion 130. Thus, the portion of each of the two locator pins 182 extending away from the second side 134 of the first shell portion 130 is aligned with and disposable within a different one of the two frame openings 112.

Although the first shell portion 130 shown in FIGS. 1-4 defines the two locator pin openings 146, in some implementations, the first end of the second shell portion defines the locator pin openings. In some implementations, the first shell portion or the second shell portion define any number of one or more locator pin openings. In some implementations, the device does not include locator pin openings. In some implementations, the locator pins are integrally formed with the first shell portion or the second shell portion. In some implementations, the locator pins are integrally formed with the portion of the frame of the bimini and are disposable within the locator pin openings of the first shell portion or the second shell portion when the device is coupled to the portion of the frame of the bimini.

As shown in FIGS. 1-4, the second end 154 of the second shell portion 150 defines a second central opening 156 extending to the first end 152 of the second shell portion 150. The second central opening 156 is configured such that a cable of the camera 170 disposed within the central opening 136 of the first shell portion 130 extends through the second central opening 156.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A bimini mountable camera device, the device comprising:
   a first shell portion having a first end and a second end opposite and spaced apart from the first end of the first shell portion, wherein the first end of the first shell portion defines a central opening extending along a central axis to the second end of the first shell portion, wherein the second end of the first shell portion defines a first groove extending along a first groove axis, wherein the first groove axis extends perpendicular to the central axis, wherein the first groove has a semi-circular cross-section as viewed in a plane perpendicular to the first groove axis;
   a second shell portion having a first end and a second end opposite and spaced apart from the first end of the second shell portion, wherein the first end of the second shell portion is couplable to the second end of the first shell portion, wherein the first end of the second shell portion defines a second groove extending along a second groove axis, wherein the second groove axis extends parallel to the first groove axis when the first end of the second shell portion is coupled to the second end of the first shell portion, wherein the second groove has a semi-circular cross-section as viewed in a plane perpendicular to the second groove axis; and
   a camera at least partially disposed within the central opening.

2. The device of claim 1, wherein a radius of curvature of the first groove as viewed in a plane perpendicular to the first groove axis is the same as a radius of curvature of the second groove as viewed in a plane perpendicular to the second groove axis.

3. The device of claim 1, wherein a radius of curvature of the first groove as viewed in a plane perpendicular to the first groove axis and a radius of curvature of the second groove as viewed in a plane perpendicular to the second groove axis are sized to receive a portion of a frame for a bimini.

4. The device of claim 1, wherein the second end of the first shell portion defines a first set of one or more fastener openings, wherein the first end of the second shell portion defines a second set of one or more fastener openings, wherein each of the fastener openings of the first set of one or more fastener openings is alignable with a different one of the second set of one or more fastener openings when the first end of the second shell portion is coupled to the second end of the first shell portion.

5. The device of claim 4, wherein the first end of the second shell portion is coupled to the second end of the first shell portion by one or more fasteners extending through a first fastener opening of the first set of one or more fastener openings and a second fastener opening of the second set of one or more fastener openings.

6. The device of claim 1, wherein the central opening is a first central opening, wherein the second end of the second shell portion defines a second central opening, wherein a cable of the camera is configured to extend through second central opening when the first end of the second shell portion is coupled to the second end of the first shell portion.

7. The device of claim 1, wherein the first shell portion, the second shell portion, and the camera form a water-tight seal when the first end of the second shell portion is coupled to the second end of the first shell portion.

8. The device of claim 1, wherein one of the second side of the first shell portion or the first side of the second shell portion defines one or more locator pin openings.

9. The device of claim 8, further comprising one or more locator pins, wherein each of the one or more locator pins are disposed within a different one of the locator pin openings.

10. The device of claim 8, wherein the one or more locator pin openings comprises two locator pin openings.

11. A bimini mounted camera system, the system comprising:
    a frame for a bimini; and
    a bimini mountable camera device, the device comprising:
        a first shell portion having a first end and a second end opposite and spaced apart from the first end of the first shell portion, wherein the first end of the first shell portion defines a central opening extending along a central axis to the second end of the first shell portion, wherein the second end of the first shell portion defines a first groove extending along a first groove axis, wherein the first groove axis extends perpendicular to the central axis;
        a second shell portion having a first end and a second end opposite and spaced apart from the first end of the second shell portion, wherein the first end of the second shell portion is couplable to the second end of the first shell portion, wherein the first end of the second shell portion defines a second groove extending along a second groove axis, wherein the second groove axis extends parallel to the first groove axis when the first end of the second shell portion is coupled to the second end of the first shell portion; and
        a camera at least partially disposed within the central opening,
    wherein the second side of the first shell portion is coupled to the first side of the second shell portion such that a portion of the frame of the bimini is disposed within the first groove and the second groove.

12. The system of claim 11, wherein the first groove has a semi-circular cross-section as viewed in a plane perpendicular to the first groove axis, wherein the second groove has a semi-circular cross-section as viewed in a plane perpendicular to the second groove axis.

13. The system of claim 12, wherein a radius of curvature of the first groove as viewed in a plane perpendicular to the first groove axis is the same as a radius of curvature of the second groove as viewed in a plane perpendicular to the second groove axis.

14. The system of claim 11, wherein the second end of the first shell portion defines a first set of one or more fastener openings, wherein the first end of the second shell portion defines a second set of one or more fastener openings, wherein each of the fastener openings of the first set of one or more fastener openings is aligned with a different one of the second set of one or more fastener openings.

15. The system of claim 14, wherein the first end of the second shell portion is coupled to the second end of the first shell portion by one or more fasteners extending through a first fastener opening of the first set of one or more fastener openings and a second fastener opening of the second set of one or more fastener openings.

16. The system of claim 11, wherein the central opening is a first central opening, wherein the second end of the second shell portion defines a second central opening, wherein a cable of the camera extends through second central opening.

17. The system of claim 11, wherein the first shell portion, the second shell portion, and the camera form a water-tight seal.

18. The system of claim 11, wherein one of the second side of the first shell portion or the first side of the second shell portion defines one or more locator pin openings.

19. The system of claim 18, further comprising one or more locator pins, wherein the portion of the frame of the bimini defines frame openings, wherein each of the one or more locator pins are disposed within a different one of the locator pin openings and within a different one of the frame openings.

20. The system of claim 18, wherein the one or more locator pin openings comprises two locator pin openings.

\* \* \* \* \*